US008090739B2

(12) United States Patent
Dettinger et al.

(10) Patent No.: US 8,090,739 B2
(45) Date of Patent: Jan. 3, 2012

(54) UTILIZATION OF LOGICAL FIELDS WITH CONDITIONAL MODIFIERS IN ABSTRACT QUERIES

(75) Inventors: Richard D. Dettinger, Rochester, MN (US); Daniel P. Kolz, Rochester, MN (US); Richard J. Stevens, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1838 days.

(21) Appl. No.: 10/965,183

(22) Filed: Oct. 14, 2004

(65) Prior Publication Data

US 2006/0085436 A1  Apr. 20, 2006

(51) Int. Cl.
*G06F 7/00* (2006.01)
*G06F 17/30* (2006.01)
(52) U.S. Cl. .................. 707/769; 707/764; 707/723
(58) Field of Classification Search .......... 700/100–102; 707/203, 100–102, 201, 769; 714/15
See application file for complete search history.

(56) References Cited

U.S. PATENT DOCUMENTS

| 5,021,995 | A | * | 6/1991 | Quint et al. ................... 707/101 |
| 5,247,665 | A | * | 9/1993 | Matsuda et al. ............... 707/101 |
| 5,734,887 | A | * | 3/1998 | Kingberg et al. .................. 707/4 |
| 6,725,227 | B1 | | 4/2004 | Li |
| 2002/0078068 | A1 | * | 6/2002 | Krishnaprasad et al. .. 707/104.1 |
| 2003/0167274 | A1 | * | 9/2003 | Dettinger et al. ............. 707/100 |
| 2005/0021541 | A1 | * | 1/2005 | Rangadass et al. ........... 707/100 |

OTHER PUBLICATIONS

U.S. Appl. No. 10/083,075, "Application Portability and Extensibility Through Database Schema and Query Abstraction", filed Feb. 26, 2002.

* cited by examiner

*Primary Examiner* — Etienne Leroux
*Assistant Examiner* — Mohammad Rahman
(74) *Attorney, Agent, or Firm* — Patterson & Sheridan LLP

(57) ABSTRACT

Methods, systems, and articles of manufacture for enhancing abstract queries by utilizing conditional modifiers with logical fields are provided. Conditional modifiers allow for the referencing of multiple physical fields via a single logical field. Further, conditional modifiers facilitate the ability to specify, on an instance by instance basis, which physical field or combination of physical fields a particular logical field should reference.

20 Claims, 12 Drawing Sheets

WEIGHT HISTORY TABLE — 800

| PID — 801 | HISTORICAL WEIGHT — 802 | HISTORICAL DATE — 803 |
|---|---|---|
| 1 | 230 | 1/1/00 |
| 1 | 220 | 1/1/01 |
| 1 | 210 | 1/1/02 |
| 1 | 200 | 1/1/03 |
| ... | ... | ... |

FIG. 8

DEMOGRAPHIC TABLE — 700

| PID — 701 | NAME — 702 | WEIGHT — 703 | DATE — 704 |
|---|---|---|---|
| 1 | RICH | 190 | 1/1/04 | ... |
| 2 | MATT | 185 | 1/1/04 | ... |
| 3 | JEFF | 180 | 1/3/04 | ... |
| ... | ... | ... | ... | ... |

FIG. 7

UTILIZATION OF LOGICAL FIELDS WITH CONDITIONAL MODIFIERS IN ABSTRACT QUERIES

CROSS-REFERENCE TO RELATED APPLICATIONS

The present application is related to commonly owned, co-pending U.S. patent application Ser. No. 10/083,075, filed Feb. 26, 2002, entitled "Application Portability And Extensibility Through Database Schema And Query Abstraction", which is incorporated herein by reference.

BACKGROUND OF THE INVENTION

1. Field of the Invention

The present invention generally relates to data processing and more particularly to utilizing logical fields with conditional modifiers in abstract queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as SQL, that lets programmers and programs select, insert, update, find out the location of data, and so forth.

Unfortunately, generating queries using SQL may require a detailed understanding of the possibly complex physical layout of the underlying database and interpretation of cryptic field names. For some applications, to facilitate the query building process, an abstraction model may be utilized that, in effect, hides some of the complexities of the underlying database physical layout from users. The abstraction model may include logical fields with recognizable names that map to corresponding physical fields of the underlying database. "Abstract" queries may be generated containing conditions based on the logical fields. Upon issuance, the logical fields of an abstract query may be mapped to corresponding physical fields to create a physical or "concrete" query. For some applications, abstract queries may be saved, allowing subsequent users to reuse the saved abstract queries without having to generate their own. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

Abstract queries often contain a conditional element (e.g., a WHERE clause in a corresponding SQL statement) in which a logical field is used within an expression with a comparison operator. As described in the related application Ser. No. 10/083,075, logical fields are typically mapped to a particular physical field in a physical database. For instance, if the physical database was implemented as a relational database, a particular logical field would be mapped to a particular column within a relational table.

While abstraction makes working with the data easy and efficient, in certain instances, there remains a need to make logical fields flexible so that they can refer to more than one field in a physical database. For example, suppose that in an environment supporting a medical testing application, a logical field named WEIGHT is mapped to a column named "weight" in a relational table named demographic. Consider that the weight column contains patients' most recently measured weight. Accordingly, in abstract queries where a patient's current weight is required, the WEIGHT logical field can be utilized. For example, in order to determine the names of all patients who currently weigh more than 220 pounds, the following abstract query may be submitted: Return NAME where WEIGHT>220.

Further, suppose that patients' weights measured in previous years (i.e., historical weight) is also available in the database. However, the historical data is not available in the demographic table, but rather in a separate table called weight_history. A logical field called HISTORICAL_WEIGHT is mapped to the weight column of weight_history table. Therefore, the names of all patients who have weighed more than 220 in the past can be found via the following query: Return NAME where HISTORICAL_WEIGHT>220.

In terms of the above example queries, if the user wanted to consolidate the two sets of query results pertaining to current patient weight data and historical patient weight data, they would have to run two separate queries (as shown above) and then merge the query results.

Further, it should be recognized that the WEIGHT and the WEIGHT_HISTORY logical fields represent different perspectives of the same data. For example, the WEIGHT logical field represents current data regarding patients' weights, and the WEIGHT_HISTORY logical field represents historical data. In many cases, it would be beneficial to provide users the ability to gain access to multiple physical fields via a single logical field. For instance, in the above example, it would be beneficial to provide users access to both the current data and the historical data via a single logical field, such as the WEIGHT logical field. Unfortunately, the infrastructure facilitating existing data abstraction models may not be flexible enough to allow for the referencing of multiple physical data sources as described above. Therefore, what is needed is a data abstraction solution that allows for the referencing of multiple physical fields via a single logical field. A further need is to provide users the ability to specify, on an instance by instance basis, which physical field or combination of physical fields a particular logical field should reference.

SUMMARY OF THE INVENTION

The present invention is generally directed to methods, systems and articles of manufacture for utilizing conditional modifiers with abstract queries.

One embodiment of the present invention provides a data processing system for retrieving data. The data processing system generally includes an abstract model comprising a plurality of definitions of logical fields, each definition comprising a logical field name and a mapping referencing physical data, wherein at least one logical field comprises at least a first mapping referencing data in a first physical data structure, a second mapping referencing data in a second physical data structure, and a first conditional modifier allowing the logical field to be selectably mapped to the first physical data structure using the first mapping or the second physical data structure using the second mapping, depending on the presence of the first conditional modifier in an abstract query containing the at least one logical field. The data processing system also includes a query processor configured to convert one or more abstract queries containing logical fields configured with conditional modifiers into one or more executable queries of a given query language by referencing the abstract model.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 illustrates an exemplary table that is used to support examples demonstrating functionality related to conditional modifiers, according to one embodiment of the invention.

FIG. 8 illustrates another exemplary table that is used to support examples demonstrating functionality related to conditional modifiers, according to one embodiment of the invention.

DETAILED DESCRIPTION OF THE PREFERRED EMBODIMENTS

Figure 1:
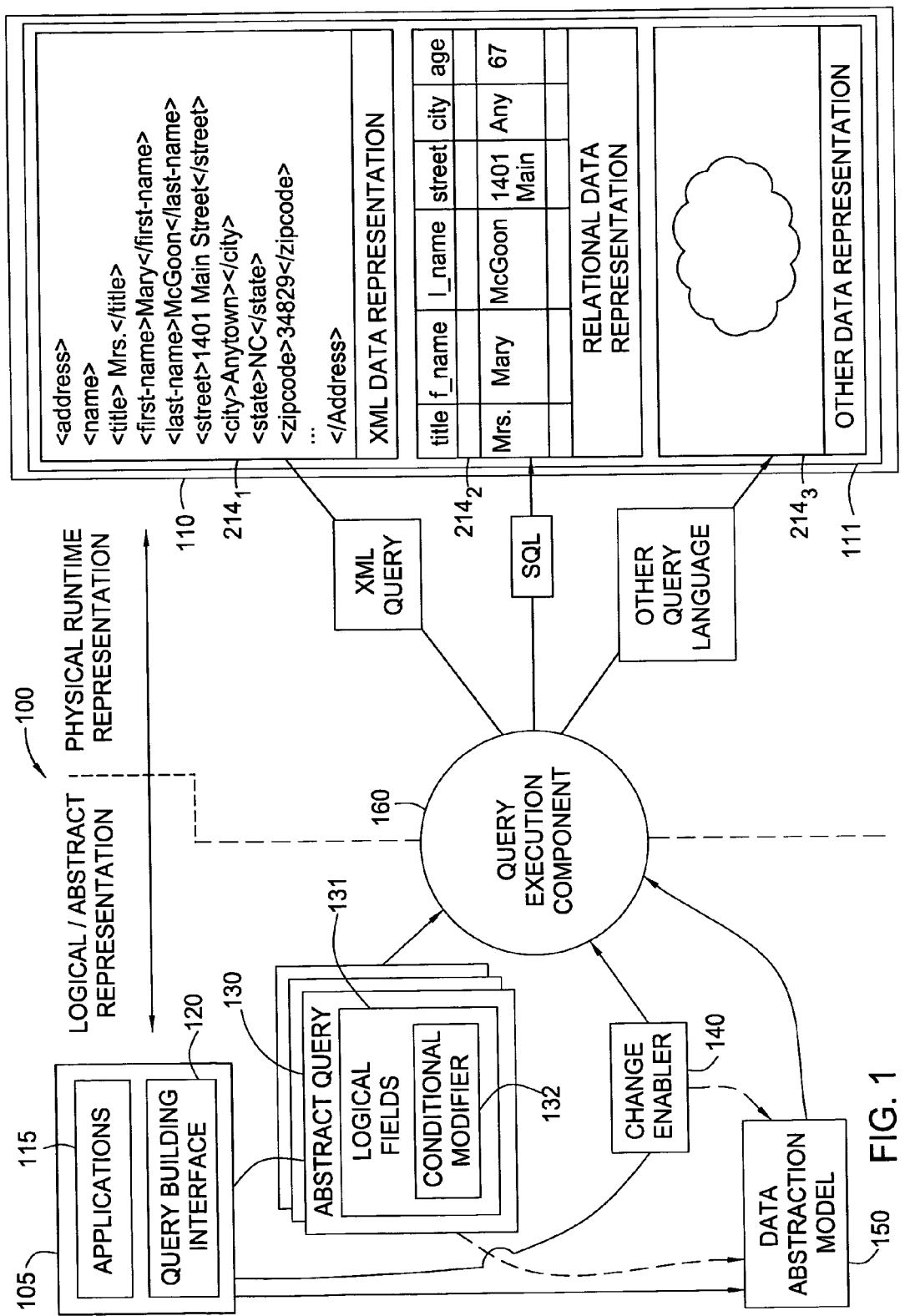
FIG. 1 is a relational view of software and hardware components of one embodiment of the invention.

The present invention is generally directed to methods, systems and articles of manufacture for enhancing abstract queries by utilizing conditional modifiers with logical fields.

Further, in the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

As used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term database generally refers to a collection of data arranged for ease and speed of search and retrieval. While the following description focuses on transaction statements (such as queries) for relational databases, those skilled in the art will recognize the methods described herein may be used with any type of database including an object-relational database and an XML-based database.

In one embodiment of a data abstraction model, users may compose an abstract query using a set of logical fields defined by a data abstraction layer. The data abstraction layer, along with an abstract query interface, provide users with an abstract view of the data available to query (e.g., search, select, and modify). The data itself is stored in a set of underlying physical databases using a concrete physical representation (e.g., a relational database). The physical representation may include a single computer system, or may comprise many such systems accessible over computer networks. The data abstraction layer provides a logical view of one or more such underlying data repositories that is independent of the particular manner of data representation. Where multiple data sources are provided, each logical field may be is configured to include a location specification identifying the location of the data to be accessed. A runtime component is configured to resolve an abstract query into a form that can be issued against the underlying physical data repositories.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed across communications media, (e.g., a computer or telephone network) including wireless communications. The latter embodiment specifically includes information downloaded from the internet and other networks. Such signal-bearing media, when carrying computer-readable instructions that perform methods of the present invention, represent embodiments of the present invention.

In general, the routines executed to implement the embodiments of the invention, may be part of an operating system or a specific application, component, program, module, object, or sequence of instructions. The software of the present invention typically is comprised of a plurality of instructions capable of being performed using a computer system. Also, programs typically also include variables and data structures that reside in memory or on storage devices as part of their operation. In addition, various programs described hereinafter may be identified based upon the application for which they are implemented in a specific embodiment of the invention. Those skilled in the art will recognize, however, that any particular nomenclature that follows is used merely for convenience, and thus does not limit the invention for use solely in any specific application identified or implied by such nomenclature. Furthermore, the functionality of programs described here in uses discrete modules or components interacting with one another. Those skilled in the art will recognize that different embodiments may combine or merge the components and modules described herein in many different ways.

An Exemplary System

FIG. 1 illustrates a relational view of hardware and software components of a data processing system 100 in accordance with one embodiment of the invention. The system 100 illustratively includes a client computer system 105 comprising a variety of applications including a query building interface 120 for accessing data in a database 111, via a database management system (DBMS) 110. As illustrated, the database 111 may accommodate data in a variety of different physical representations 214, such as extensible markup language (XML) representation $214_1$, relational representation $214_2$, or some other data representation $214_3$.

The system 100 may include a data abstraction model (DAM) 150 that, in effect, shields a user from the details of the particular physical representation of the database 111. The DAM 150, also referred to as a data repository abstraction (DRA) in related applications, may define a set of logical fields that map to underlying physical fields of the underlying database 111. Users may be able to create abstract queries based on the logical fields, via the query building interface 120. Upon issuance of abstract queries, a query execution component 160 may convert an abstract query into a physical or "concrete" query suitable for issuance against the database 111 by mapping logical fields of the abstract query to physical fields of the particular physical representation 214, based on the field definitions in the DAM 150.

Additionally, embodiments of the present invention allow for a particular logical field 131 to be mapped to two or more physical fields residing in multiple physical data structures. Within abstract queries 130, logical fields 131 are often used within the conditional portion of the abstract query statement. According to embodiments of the present invention, logical fields are configured to be used with conditional modifiers 132. Logical fields 131 configured with conditional modifiers 132 are capable of referencing data in more than one physical data structure. As will be described in greater detail later, when these fields are used in the conditional portion of abstract queries 130, a conditional modifier can be utilized to allow the user to specify which particular physical data structure the logical field should reference for a particular implementation of an abstract query 130.

There may be instances, however, where an alternative physical data structure may not be available for the logical field 131 to reference based on the conditional modifier 132. In these instances, it may be necessary to define a change enabler 140 that may be implemented as a program module that creates the alternative physical data structure (e.g. a table) and populates the new structure with data as specified by the user.

Figure 2:
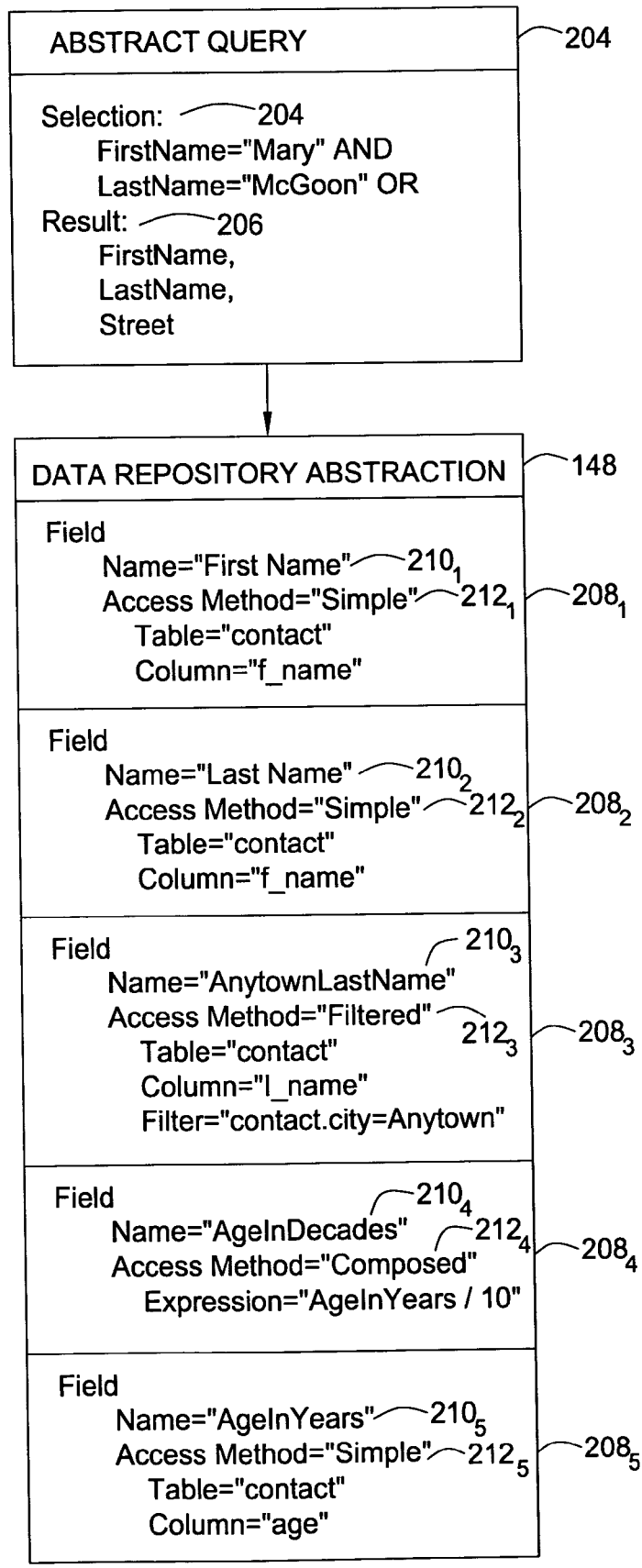
FIG. 2 illustrates an abstract query and corresponding data repository abstraction component, according to one embodiment of the invention.

FIG. 2 illustrates one embodiment of a component of the data abstraction model 150 that comprises a plurality of logical field specifications $208_{1-5}$ (five shown by way of example), collectively referred to as field specifications 208. Specifically, a field specification 208 is provided for each logical field 131 available for composition of an abstract query 130. Each field specification 208 identifies a logical field name $210_1$, $210_2$, $210_3$, $210_4$, $210_5$ (collectively, field name 210) and an associated access method $212_1$, $214_2$, $212_3$, $212_4$, $212_5$ (collectively, access method 212). The access methods map a logical field 130 to a particular physical data representation $214_1$, $214_2$ ... $214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated.

Any number of access methods are contemplated depending upon the number of different types of logical fields to be supported. In one embodiment, access methods for simple fields, filtered fields and composed fields, and logical fields with conditional modifiers are provided. Logical fields configured to work with conditional modifiers are capable of representing data in more than one physical data structure. When these logical fields are used in the conditional portion of abstract queries, a conditional modifier can be specified to allow the user to specify which particular physical data structure the logical field should reference for that particular query. Logical fields with conditional modifiers are described in greater detail below.

Referring back to FIG. 2, the field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2 maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2 in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2 the composed field access method $212_3$ maps the logical field name $210_3$ "AgeInDecades" to "AgeInYears/10". Another example is a sales tax field that is composed by multiplying a sales price field by a sales tax rate.

By way of example, the field specifications 208 of the component of the data abstraction model 150 shown in FIG. 1 are representative of logical fields mapped to data represented in the relational data representation $214_2$. However, other instances of the data abstraction model 150 map logical fields to other physical data representations, such as XML. An illustrative abstract query corresponding to the abstract query 130 containing logical fields 131 with conditional modifiers 132 illustrated in FIG. 1 is shown in Table I below. Again, in this example, the data abstraction model 150 is defined using XML.

TABLE I

QUERY EXAMPLE

```
001    <?xml version="1.0"?>
002    <!--Query string representation: (FirstName = "Mary" AND
003    LastName = "McGoon") OR State = "NC"-->
004    <QueryAbstraction>
005      <Selection>
006        <Condition internalID="4">
007          <Condition field="FirstName" operator="EQ" value=
008    "Mary" internalID="1"/>
009          <Condition field="LastName" operator="EQ" value=
              "McGoon"
```

TABLE I-continued

QUERY EXAMPLE

```
010          <Conditional modifier="was">
011    internalID="3" relOperator="AND"></Condition>
012          </Condition>
013          <Condition field="State" operator="EQ" value="NC"
014    internalID="2" relOperator="OR"></Condition>
015      </Selection>
016      <Results>
017        <Field name="FirstName"/>
018        <Field name="LastName"/>
019        <Field name="Street"/>
020      </Results>
021    </QueryAbstraction>
```

The abstract query shown in Table I includes a selection specification (lines 005-015) containing selection criteria and a results specification (lines 016-020). In one embodiment, a selection criterion consists of a field name representing the logical field, a conditional modifier associated with the logical field, a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a component of the data abstraction model 150 (defined using XML) corresponding to the abstract query in Table I is shown in Table II below. For this example, the data abstraction model is defined using XML.

TABLE II

DATA REPOSITORY ABSTRACTION EXAMPLE

```
001    <?xml version="1.0"?>
002    <DataRepository>
003      <Category name="Demographic">
004        <Field queryable="Yes" name="FirstName" displayable="Yes">
005          <AccessMethod>
006            <Simple columnName="f_name" tableName="contact"></Simple>
007          </AccessMethod>
008          <Type baseType="char"></Type>
009        </Field>
010        <Field queryable="Yes" name="LastName" displayable="Yes">
011          <AccessMethod>
012            <Simple columnName="l_name" tableName="contact"></Simple>
013          </AccessMethod>
014          </AccessMethod>
015            <Conditional_modifier_based columnName= "l_name"
016              tablename="previous_contact"></Conditional_modifier_based>
017          </AccessMethod>
018          <Type baseType="char"></Type>
019        </Field>
020        <Field queryable="Yes" name="State" displayable="Yes">
021          <AccessMethod>
022            <Simple columnName="state" tableName="contact"></Simple>
023          </AccessMethod>
024          <Type baseType="char"></Type>
025        </Field>
026        <Field queryable="Yes" name="Weight">
027          <AccessMethod>
028            <Simple attrName="weight" entityName="demographic">
029          </AccessMethod>
030          <Type baseType="Int" />
031        </Field>
032        <Field name="Weight History">
033          <AccessMethod>
034            <Simple attrName="historical_weight" entityName
035              ="weight_history">
036          </AccessMethod>
037          <Type baseType="Int" />
038        </Field>
039      </Category>
```

TABLE II-continued

DATA REPOSITORY ABSTRACTION EXAMPLE

```
040        <Relations>
041            <Link id="AnyName" source="DEMOGRAPHIC"
042                target="WEIGHT_HISTORY" type="LEFT" >
043                <LinkPoint source="PID" target="PID" />
044            </Link>
045        </Relations>
046    </DataRepository>
```

Figure 3:
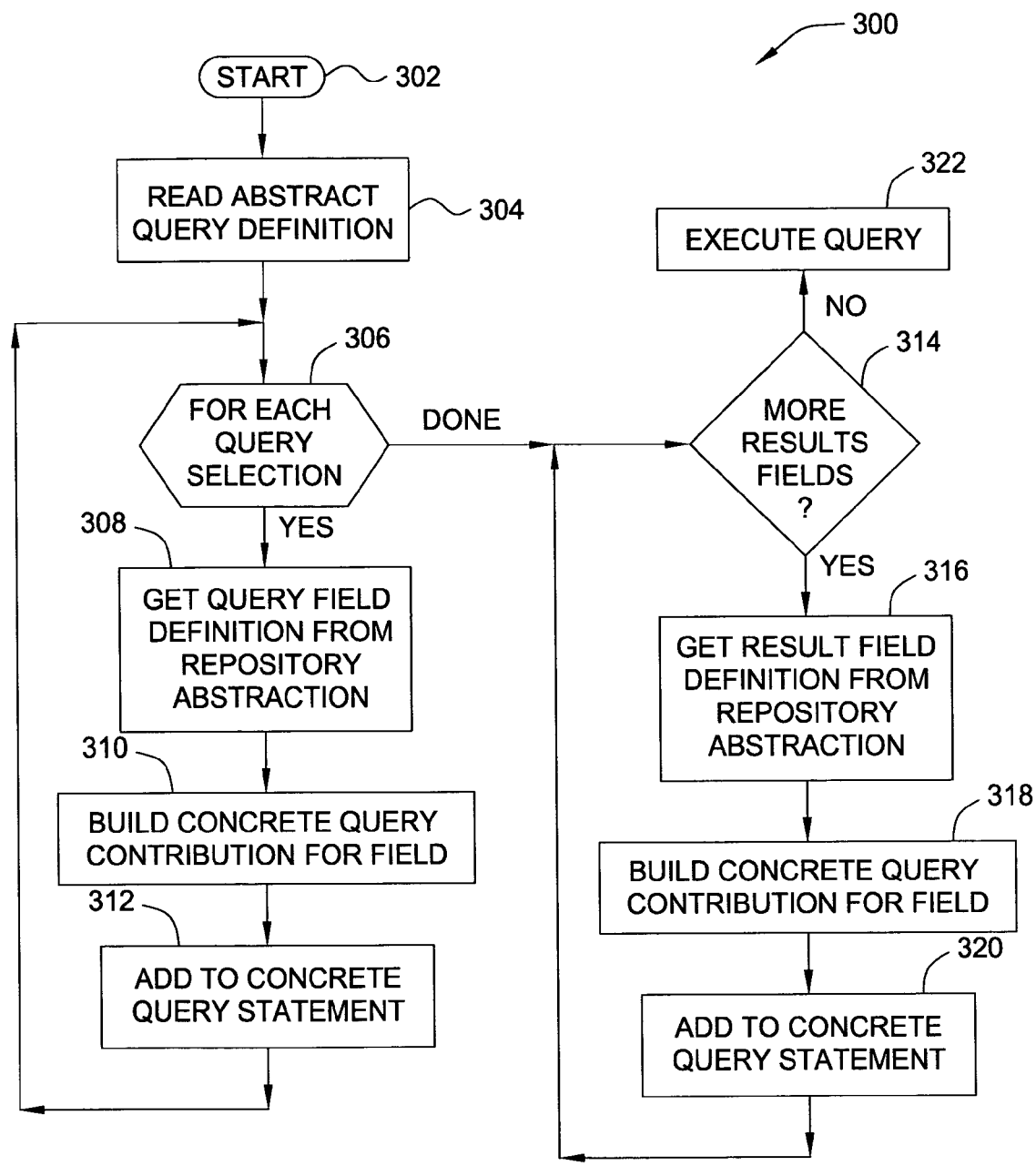
FIG. 3 is a flow chart illustrating the operation of a runtime component, according to one embodiment of the invention.

FIG. 3 shows an illustrative runtime method 300 exemplifying one embodiment of the operation of the query execution component 160. The method 300 processes an abstract query by mapping logical fields and conditional modifiers included in the abstract query to the underlying data using the access method specified for each query. Operations 300 begin at step 302 when the query execution component 160 receives as input an instance of an abstract query (such as the abstract query 130 shown in FIG. 1). At step 304, the query execution component 160 reads and parses the instance of the abstract query and locates individual selection criteria and desired result fields. At step 306, the query execution component 160 enters a loop (comprising steps 306, 308, 310 and 312) for processing each query selection criteria statement present in the abstract query, thereby building a data selection portion of a concrete query, also referred to herein as a physical query or executable query. In one embodiment, a selection criterion consists of a field name (for a logical field), a comparison operator (=, >, <, etc) and a value expression (what the field is being compared to).

At step 308, the query execution component 160 uses the field name from a selection criterion of the abstract query to look up the definition of the field in the data abstraction model 150. As noted above, the field definition includes a definition of the access method used to access the physical data associated with the field. The query execution component 160 then builds (step 310) a concrete query contribution for the logical field and conditional modifiers being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the database 111 shown in FIG. 1. The concrete query contribution generated for the current field is then added to a concrete query statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, query execution component 160 identifies the information to be returned as a result of query execution. As described above, in one embodiment, the abstract query defines a list of logical fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the query execution component 160 looks up a result field name (from the result specification of the abstract query) in the data abstraction model 150 and then retrieves a result field definition from the data abstraction model 150 to identify the physical location of data to be returned for the current logical result field. The query execution component 160 then builds (as step 318) a concrete query contribution (of the concrete query that identifies physical location of data to be returned) for the logical result field. At step 320, concrete query contribution is then added to the concrete query Statement.

Figure 4:
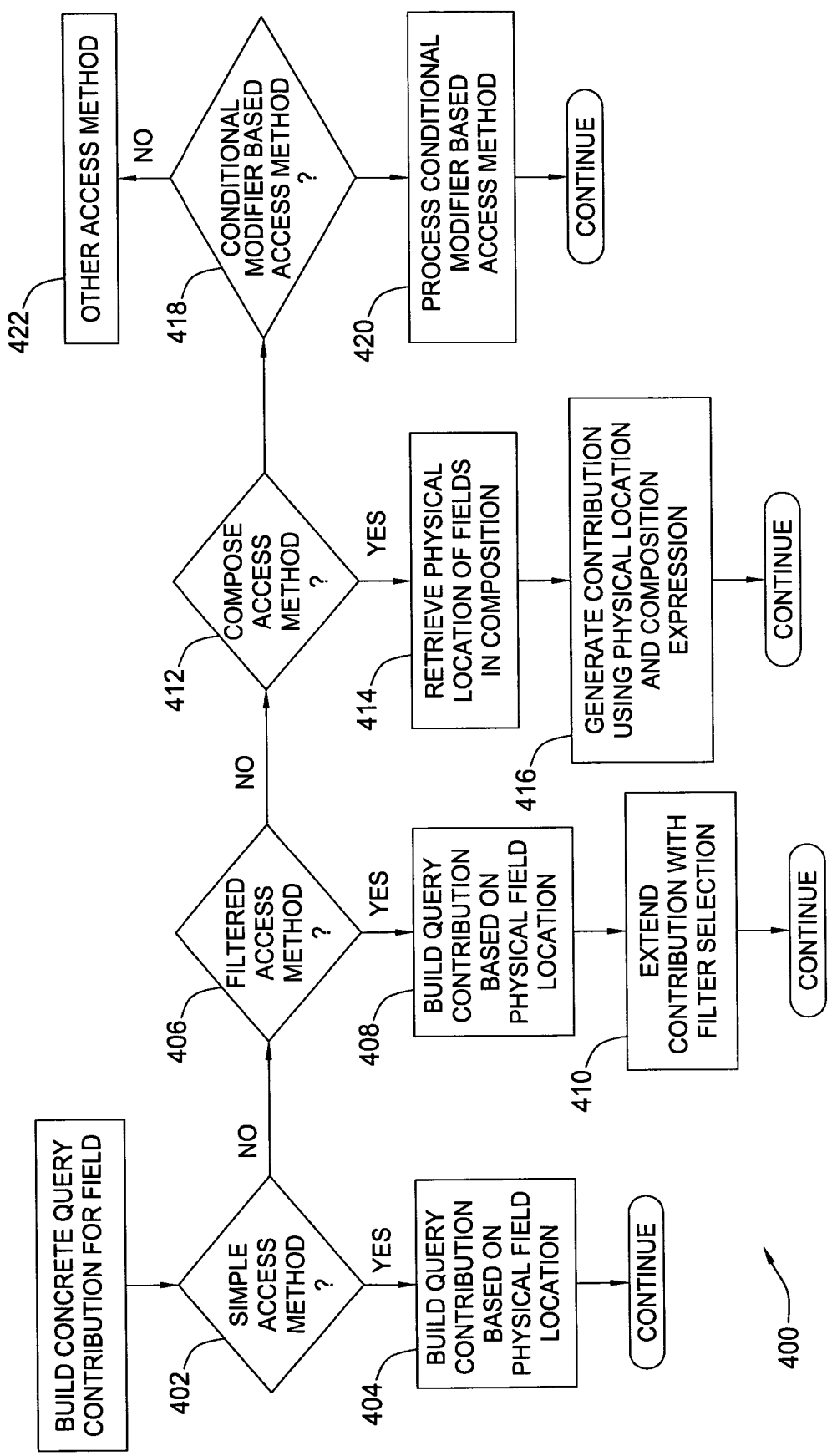
FIG. 4 is a flow chart further illustrating the operation of a runtime component, according to one embodiment of the invention.

One embodiment of a method 400 for building a concrete query contribution for a logical field according to steps 310 and 318 is described with reference to FIG. 4. At step 402, the method 400 queries whether the access method associated with the current logical field is a simple access method. If so, the concrete query contribution is built (step 404) based on physical data location information (step 405). Processing then continues according to method 300 described above. Otherwise, processing continues to step 406 to query whether the access method associated with the current logical field is a filtered access method. If so, the concrete query contribution is built (step 408) based on physical data location information for some physical data entity. At step 410, the concrete query contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the concrete query contribution is generated. Processing then continues according to method 300 described above.

If the access method is not a composed access method, at step 418 it is determined if the access method is a conditional modifier based access method. If it is, at step 420 the conditional modifier based access method is processed according to operations 500 illustrated in FIG. 5. However, if the access method is not a conditional modifier based access method, processing proceeds from step 420 to step 422. Step 422 is representative of any other access method types contemplated as embodiments of the present invention. Those skilled in the art will recognize that embodiments are contemplated in which less then all the available access methods are implemented. For example, in a particular embodiment only simple access methods are used. In another embodiment, only simple access methods and filtered access methods are used.

Figure 5:
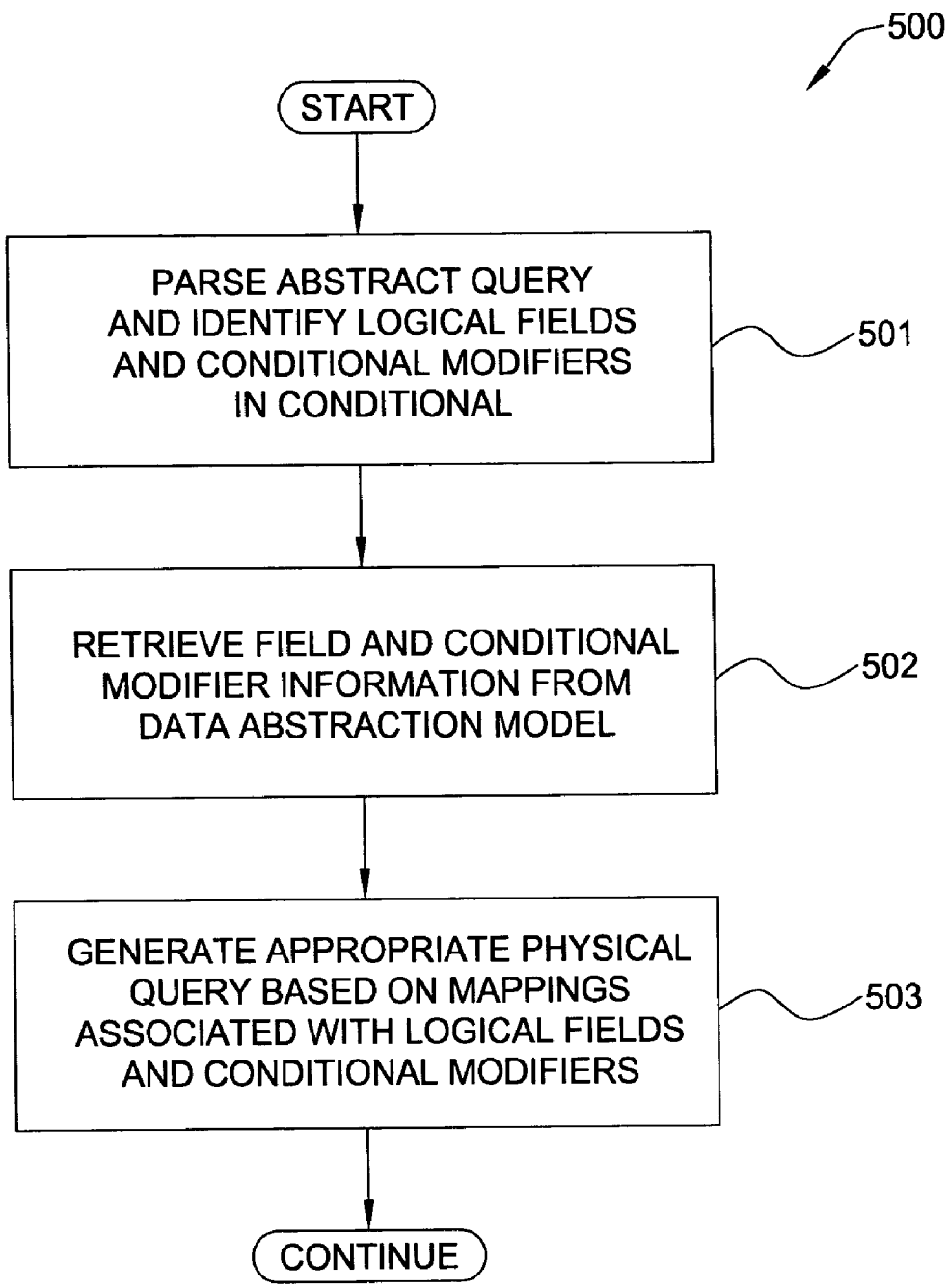
FIG. 5 is a flow chart illustrating the high-level processing steps related to processing an abstract query according to the conditional modifier based access method.

As shown in FIG. 5, processing related to the conditional modifier based access method begins at step 501 with the parsing of an abstract query 130 in order to identify logical fields 131 with conditional modifiers 132 in the conditional portion of the abstract query 130. At step 502, information, such as field mappings, associated with the identified logical fields with conditional modifiers (from step 501) is retrieved from the DAM 150. Next, at step 503, an appropriate physical query is generated based on mappings associated with the identified logical fields 131 and conditional modifiers 132.

Figure 6:
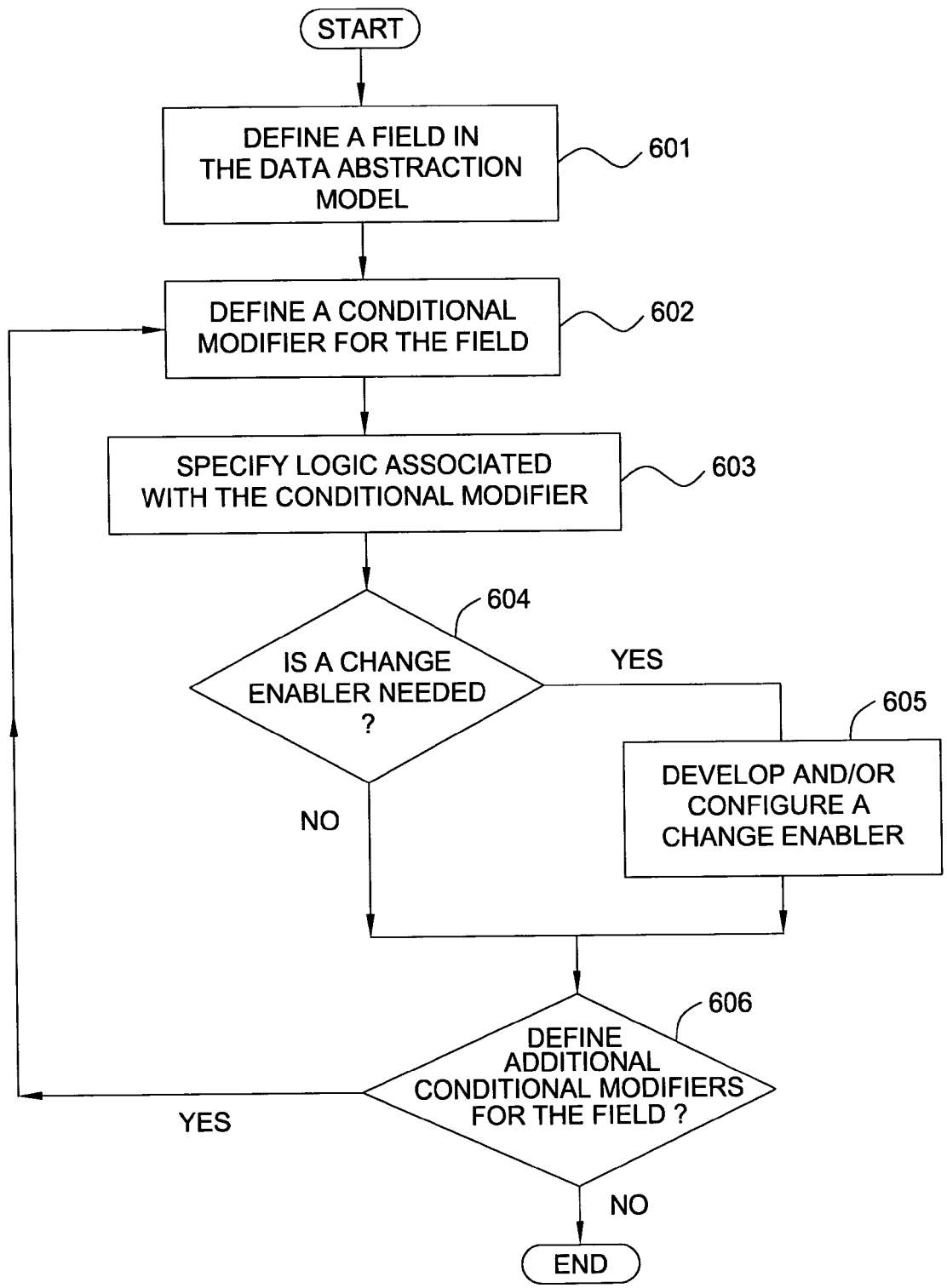
FIG. 6 illustrates a flow chart that describes the process of configuring a logical field to be used with conditional modifiers.

FIG. 6 is a flow chart of exemplary operations 600 related to defining a logical field with conditional modifiers. At step 601, a logical field is defined in the data abstraction model. A detailed description of the process involved in defining a logical field within a data abstraction model so that the logical field is mapped to a corresponding physical field in a database is described in related the commonly owned, co-pending U.S. patent application Ser. No. 10/083,075, entitled "Application Portability And Extensibility Through Database Schema And Query Abstraction," filed Feb. 26, 2002. Embodiments of the present invention extend the functionality of logical fields by including functionality associated with conditional modifiers. Accordingly, logical fields 131 are further configured with conditional modifiers 132 so that multiple mappings between the logical field and physical fields can be utilized. The discussion below is focused on the conditional modifier 132 related aspects of the creation and implementation of logical fields.

At step 602, a loop of operations 602-606 is entered. These operations are directed to defining conditional modifiers for the present logical field defined in step 601. Once definition of the conditional modifiers is complete, the present logical field is ready to be used with conditional modifiers within the conditional portion of abstract queries. As will be described in more detail later, the use of conditional modifiers allows for logical fields to reference data in multiple physical data structures.

At step 603, logic related to the conditional modifier is specified in abstract form. Specifically, the logic specified for the conditional modifier supports the query execution component 160 in providing an appropriate translation of an abstract query which contains a logical field with the conditional modifier, so that a functionally correct physical query is generated. Logic related to conditional modifiers is described in more detail with reference to FIG. 11.

As described above, a conditional modifier 132 allows for a logical field 131 to be mapped to multiple columns from one or more tables. There may be instances, however, where an alternative column may not be available for the logical field to point to. In these instances, it may be necessary to define a change enabler 140 to create the column within a table and then to populate the table with appropriate data. For example, in an implementation utilizing relational databases, the change enabler 140 may be implemented as a program module. In some embodiments the program may contain code that includes data definition language that, when executed, creates a database table with the appropriate columns. The program may also include instructions to create a database trigger that can execute data manipulation language commands to populate records in the new table. Change enablers 140 are described in more detail with reference to FIG. 11.

At step 604, it is determined if a change enabler 140 is needed. If a change enabler 140 is necessary, at step 605 a change enabler 140 is defined and configured per the requirements of the user. Configuration of change enablers 140 and the functionality provided by change enablers is described with more detail with reference to FIG. 11.

As mentioned earlier, it is possible for logical fields 131 to be configured with multiple conditional modifiers 132. At step 606, it is determined if additional conditional modifiers 132 are to be configured for the current logical field 131. If additional conditional modifiers 132 are desired, processing returns to step 602 in order to define the next conditional modifier 132.

FIG. 7 illustrates an exemplary database table called "demographic" according to one embodiment of the invention. The demographic table 700 contains records (or entries) that pertain to patients that are undergoing medical testing in a healthcare research environment. The demographic table 700 comprises columns 701-704. The PID ("Patient Identification") column 701 contains a unique identification number that is assigned to each patient. The patient's name and weight are stored in columns 702 and 703, respectively. The date the person's weight was measured and recorded is stored in the date column 704. It should be noted that the demographic table 700 may contain many other columns containing data related to other health related data points, such as blood pressure and heart rate.

FIG. 8 illustrates another exemplary database table according to one embodiment of the invention. The weight_history table 800 comprises the PID column 801, historical_weight column 802 and historical_date column 803. As its name implies, the weight_history table 800 contains records that contain historical data related to patient weight. For example, suppose that patients get weighed annually. The weight column 703 in the records corresponding to particular patients in the demographic table 700 would contain the patients' current weight. As its name implies, the weight_history table 800 contains patients' weights recorded in previous years. For instance, four records pertaining to the patient with PID of "1" are shown in the weight_history table 800. Each of the four records shows the measured weight of this particular patient for each of the years 2000-2003.

Those skilled in the art will recognize that the demographic table 700 and the weight_history table 800 can be "joined" in a query based on the PID column that appears in each of the tables. Some exemplary abstract queries and their corresponding physical queries which reference the demographic table 700 and weight_history table are provided below.

TABLE A

BASIC QUERY EXAMPLE

Abstract Query:

001     Return ID and NAME where WEIGHT > 220
Corresponding Physical Query:

002     select distinct PID, NAME
003         from DEMOGRAPHIC
004     where WEIGHT > 220;

Table I, shown above, contains a standard abstract query (line 001) with a logical field included in the conditional portion of the query. The purpose of this query is to retrieve the identification numbers and names of all patients who weigh greater than 220 pounds. In this example, the conditional portion of the query is "where WEIGHT>220", and the logical field in the conditional is WEIGHT. The WEIGHT logical field is mapped to the weight column 703 of the demographic table 700. As described herein, this mapping of the WEIGHT logical field will be referred to as the standard mapping. The abstract query shown in line 001 is submitted to the query execution component 160 for translation into a physical or executable query that can be submitted to the RDBMS 110. Lines 002-004 in Table A list a physical query represented in SQL that corresponds to the abstract query in line 001.

The query of Table A provides the user with a list of patients based on their current weight being greater than 220 pounds. Suppose the user wanted a list ID's and names of patients who have weighed over 220 pounds at some point in the past. According to embodiments of the present invention, the abstract query presented in line 001 of Table B below can be used to provide the desired results.

TABLE B

QUERY EXAMPLE WITH "WAS" CONDITIONAL MODIFIER

Abstract Query:

```
001    Return ID and NAME where WEIGHT was > 220
Corresponding Physical Query:

002    select distinct T1.PID, T1.NAME
003      from DEMOGRAPHIC T1, WEIGHT_HISTORY T2
004      where T2.WEIGHT > 220
005        and T1.PID = T2.PID;
```

It can be seen that the abstract query of Table B is very similar to the abstract query of Table A, with the only difference being the inclusion of the "was" conditional modifier after the WEIGHT logical field in the conditional portion of the query. As stated above, the standard mapping of the WEIGHT logical field specifies that it is mapped to the weight column 703 of the demographic table 700. However, according to embodiments of the present invention, another mapping can be created for the WEIGHT logical field. The WEIGHT logical field can also be mapped to the historical_weight column 802 of the weight_history table 800. When the WEIGHT field is used together with the "was" conditional modifier in the conditional portion of an abstract query, the new mapping to the WEIGHT column in the weight_history table 800 will be used rather than the standard mapping to the weight column 703 in the demographic table 700.

Lines 002-005 of Table B list the physical query that corresponds to the abstract query in line 001 of Table B. It can be seen that the historical_weight column 802 in the weight_history table 800, rather than the weight column 703 in the demographic table 700 is used in the WHERE clause, which corresponds to the conditional portion of the abstract query. It can also be seen that the corresponding physical query joins the demographic table 700 and the wieght_history table 800 in order to provide data pertaining to all the fields in the desired results.

Suppose the user required a list of ID's and names of patients who have weighed over 220 pounds within the past two years. The abstract query presented in line 001 of Table C below provides the desired results by utilizing yet another conditional modifier according to embodiments of the current invention.

TABLE C

QUERY EXAMPLE WITH "WAS X IN THE PAST Y YEARS" CONDITIONAL MODIFIER

Abstract Query:

```
001    Return ID and NAME where WEIGHT was > 220
002    in the past 2 years
Corresponding Physical Query:

003    select distinct T1.PID, T1.NAME
004      from DEMOGRAPHIC T1, WEIGHT_HISTORY T2
005      where T2.WEIGHT > 220
006        and T1.PID = T2.PID
007        and (current timestamp − T2.DATE) < 2 years;
```

Specifically, the "was X in the past Y years" conditional modifier is utilized in Table C, wherein during implementation at runtime, X is replaced with a comparison operator combined with a value (e.g., ">220") and Y is replaced with a numerical value (e.g., "2") associated with the number of years.

It should be understood that in addition to simply defining which physical field is to be referenced by a particular logical field, a mapping may also include additional logic directed to further processing results. For instance, the "was X in the past Y years" specifies that the WEIGHT logical field reference the historical_weight column 802 in the weight_history table 800; however the "was" conditional modifier also contains supplementary logic that specifies that the results be filtered to only include historical data from the past two years. Lines 003-007 of Table III presents a physical query that corresponds to the abstract query which includes the "was X in the past Y years". Due to the similarities between the "was" conditional modifier and the "was X in the past Y years" conditional modifier, it can be seen that lines 003-006 are identical to the physical query presented in Table B above. The physical query of Table C, however, also includes line 007 which specifies that the result set include only records from the past two years.

Embodiments of the present invention also provide support for conditional modifiers that allow for concurrently utilizing multiple mappings for a particular logical field. For instance, suppose the user wanted to retrieve records pertaining patients who currently weigh greater than 220 pounds, or have at some point in the past weighed more than 220 pounds. In other words, the results may contain both current and historical records. In this case, the standard mapping of the WEIGHT logical field combined with the mapping of WEIGHT associated with the "was" conditional modifier (described above with reference to Table B) would provide the desired results. Line 001 of Table D below contains an abstract query containing the WEIGHT field and the "has been" conditional modifier. The "has been" conditional modifier provides the combined functionality of the standard mapping and the mapping associated with the "was" conditional modifier.

TABLE D

QUERY EXAMPLE WITH "HAS BEEN" CONDITIONAL MODIFIER

Abstract Query:

```
001    Return ID and NAME where WEIGHT has been > 220
Corresponding Physical Query:

002    select distinct T1.PID, T1.NAME
003      from DEMOGRAPHIC T1, WEIGHT_HISTORY T2
004      where (T2.WEIGHT > 220 or T1.WEIGHT > 220)
005        and T1.PID = T2.PID
```

Lines 002-005 in Table D (shown above) contain a physical query which corresponds to the abstract query of line 001 containing the "has been" conditional modifier. Again, it can be seen that the physical query is very similar to the physical query based on the "was" conditional modifier (Table B). However, it can be seen in the conditional portion of the physical query (line 004) in Table D that both the weight column 303 of the demographic table 700 and the historical_weight column 802 of the weight_history table 800 are referenced.

Embodiments of the present invention can also accommodate conditional modifiers that utilize mappings that are based on calls to stored procedures. For instance, suppose using a conditional modifier called "trend" with the WEIGHT logical field results in the calling of a stored procedure that determines the annual percentage increase (or decrease) of a patient's weight. The exemplary abstract query listed in line 001 of Table E (shown below) is configured to return the ID and name of patients whose weight has increased by three percent on an annual basis.

TABLE E

QUERY EXAMPLE WITH STORED PROCEDURE BASED CONDITIONAL MODIFIER

Abstract Query:

| | |
|---|---|
| 001 | Return ID and NAME where FITNESS TREND = "FAIR" |

Corresponding Physical Query:

| | |
|---|---|
| 002 | select distinct PID, NAME |
| 003 | from DEMOGRAPHIC |
| 004 | where WEIGHT trend > 3% |

While the exemplary stored procedure presented in Table E is simple, those skilled in the art will understand that more complex stored procedures or program modules can be accommodated by embodiments of the present invention.

An Exemplary Graphical User Interface

Figure 9:
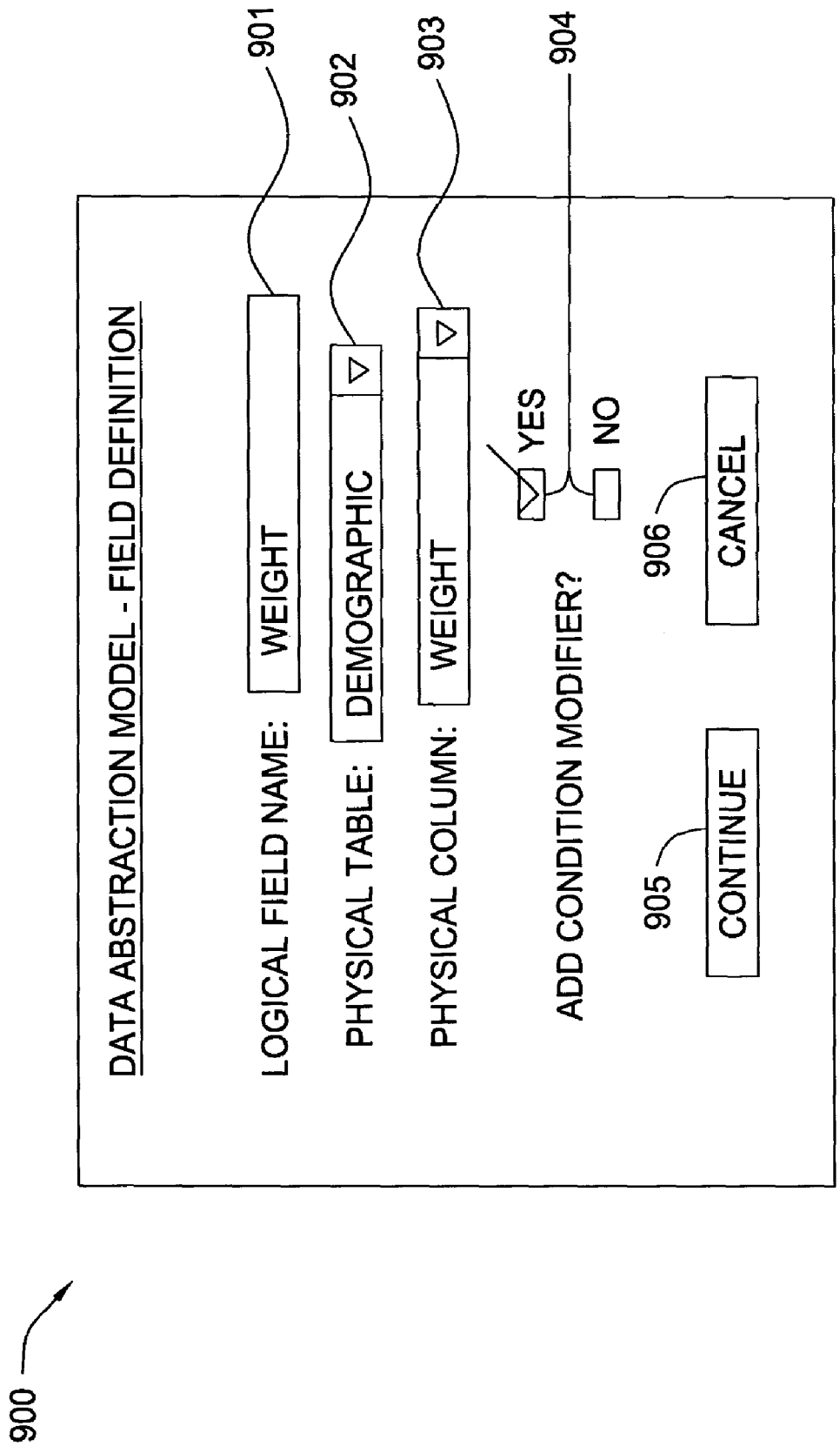
FIGS. 9-10 illustrate exemplary GUI screens directed to defining an exemplary logical field and its conditional modifier in accordance with one embodiment of the present invention.

FIGS. 9-13 are exemplary graphical user interface (GUI) screens configured to allow users (e.g., data architects or administrators) to define logical fields with conditional modifiers. FIG. 9 illustrates an exemplary GUI screen used to define logical fields, such as WEIGHT, in the DAM. The definition process associates the WEIGHT logical field with the weight column 703 in the demographic table 700. A text box 901 is provided to allow the user to specify the name of the logical field that is to be created. In this case, the WEIGHT logical field is being defined.

A drop down box 902 is provided to allow users to select the available physical data structures that can be referenced by the logical field. In one embodiment the physical database layer comprises a relational database. Accordingly, the physical data structures available for choosing via the drop down box 902 are the available relational database tables.

Based on the table selected via drop down box 902, a list of columns within the selected table is provided via drop down box 903. In this case, the user has selected the weight column 703 from the demographic table 700. Further, check boxes 904 are provided to allow users to specify if conditional modifiers are to be configured for this logical field. If the "YES" checkbox 904 is selected, and the continue button 905 is pushed, the user is presented with a GUI screen illustrated in FIG. 10.

Figure 10:
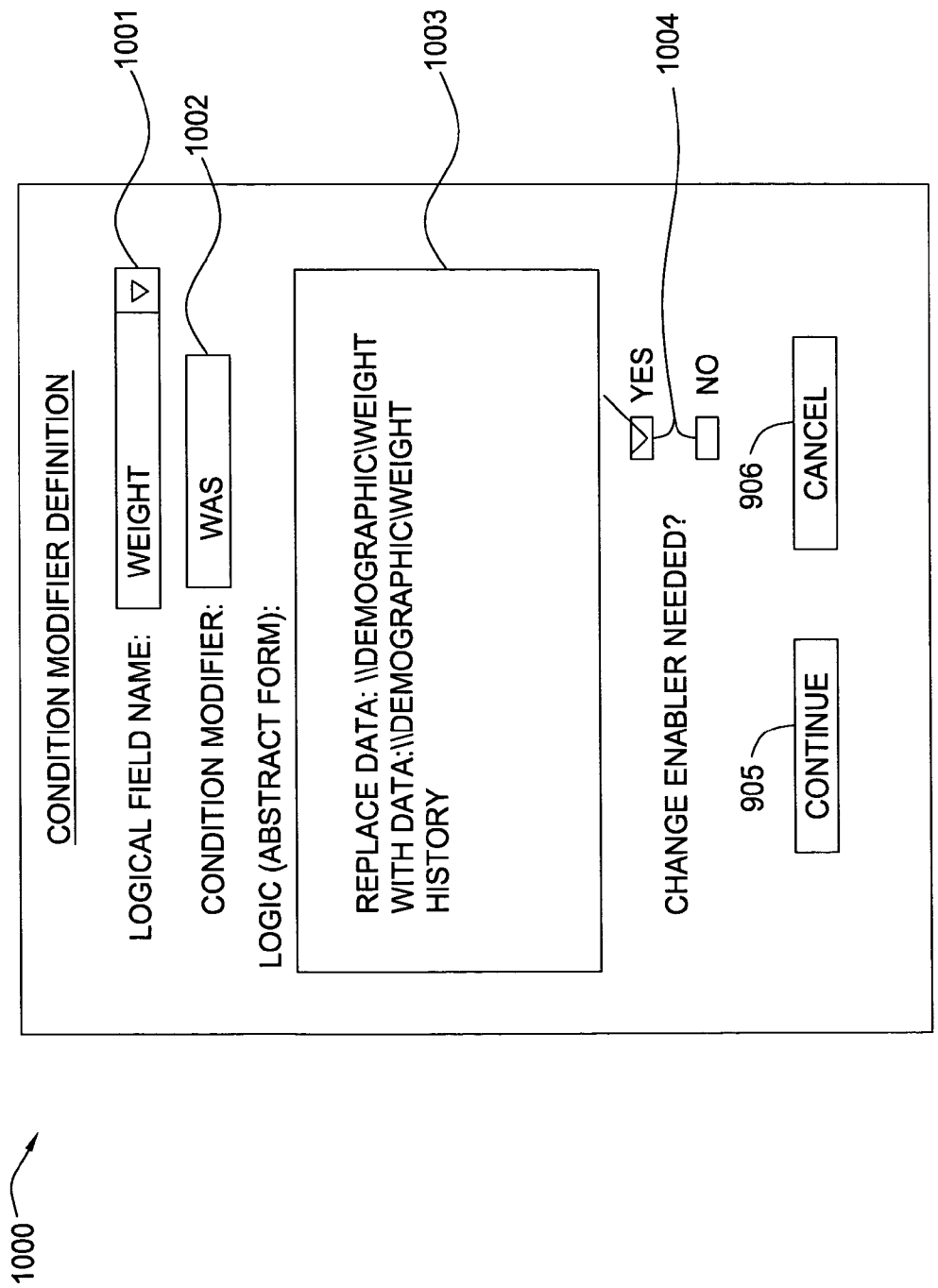

FIG. 10 illustrates a GUI screen used for defining conditional modifiers for logical fields. In this case, the "was" conditional modifier is being defined for the WEIGHT logical field. The logical field, to which the user desires to add a conditional modifier, is selected by picking from a list of fields provided via drop down box 1001. The name representing the conditional modifier is input by the user in text box 1002.

Configuring conditional modifiers for logical fields involves specifying logic that allows for the proper translation of the abstract query in which they are utilized. A free-form text box 1003 is provided to allow users to input the logic related to the conditional modifier.

TABLE F

EXEMPLARY LOGIC FOR A CONDITIONAL MODIFIER

Conditional Modifier logic:

| | |
|---|---|
| 001 | Replace data:\\Demographic\Weight |
| 002 | With data:\\Demographic\Weight History |

The syntax shown in free-form text box 1003 is listed in Table F above. Lines 001 and 002 specify that rather than referring to the weight column 703 in the demographic table 700, when used with the "was" conditional modifier, the WEIGHT logical field should be mapped to the historical_weight column 802 of the weight_history table 800. In one embodiment, the logic needed to implement this type of replacement is found in the definition of the data abstraction model as seen in lines 040-045 of Table II above.

Referring back to FIG. 10, two check boxes 1004 are provided to allow the user to specify whether a change enabler is required for the current logical field. If the "Yes" check box 1004 is selected, a change enabler definition screen (illustrated in FIG. 11) is provided. Change enablers are described in detail with reference to FIG. 11 below. However, once satisfied with the conditional modifier definition in FIG. 10, the continue button 905 can be selected to proceed with other related processing. If the user desires to leave the current screen without saving any changes, the cancel button 906 can be selected.

The examples described herein demonstrate that use of conditional modifiers supports the functionality of a particular logical field to be mapped to multiple physical data structures. It should be understood that embodiments of the present invention also facilitate the creation of physical data structures to support new mappings. For instance, consider the example abstract query listed in Table B with reference to the "was" conditional modifier. As described above, the inclusion of the "was" conditional modifier in the conditional portion of the abstract query specifies that the WEIGHT logical field should refer to data in the historical_weight column 802 in the weight_history table 800, rather than the weight column 703 in the demographic table 700. Suppose, however, that the weight_history table 800 did not yet exist. Embodiments of the current invention support the creation and population of such a table via a change enabler 140. For instance, in an implementation utilizing relational databases, the change enabler 140 facilitates the creation of a relational table within a database, and the creation of records containing data within the relational table.

A database trigger may be set up to detect changes to records within the demographic table. Upon detecting a change to a particular record, the trigger may be configured to capture the data values from the demographic table and populate the weight_history table. For instance, consider the data from the demographic table 700 and the weight_history table 800. Each time a patient's weight is updated in the demographic table, a database trigger could create a new record in the weight_history table 800 and populate the PID column 801, historical_weight column 802 and historical_date column 803 with the patient's identification number, existing value for weight and date, respectively, which is extracted from the demographic table.

Figure 11:
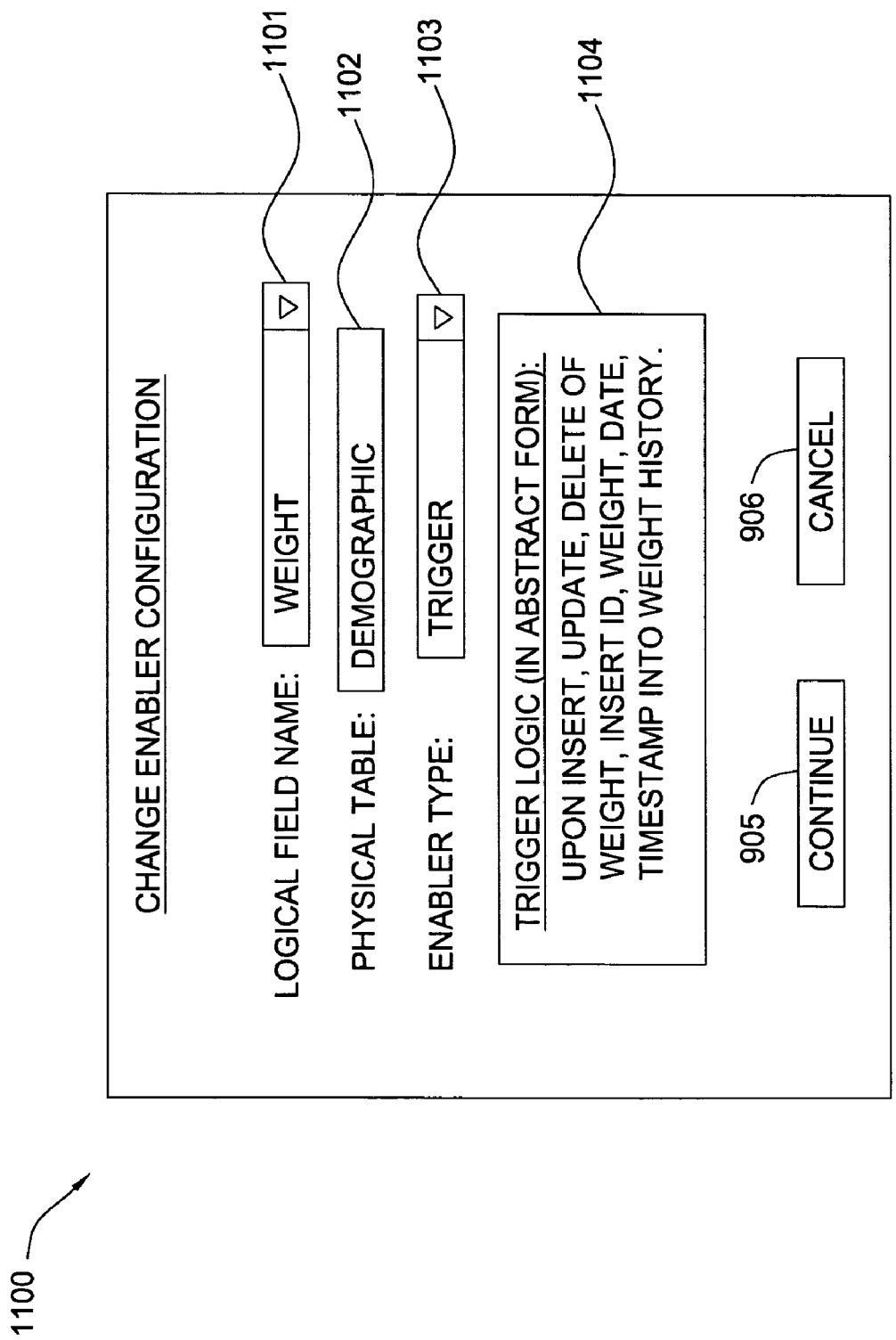
FIG. 11 illustrates an exemplary GUI screen which supports the defining of a change enabler for a logical field in a data abstraction model, according to one embodiment of the invention.

Referring now to FIG. 11, which is an exemplary GUI screen utilized for defining a change enabler for a particular logical field. A drop down box 1101 allows the user to select the logical field for which a change enabler is being defined. A label (not editable) 1102 that lists the physical data structure being referenced by the logical field based on the standard mapping is provided for reference.

A drop-down box 1103 is provided to allow the user to select the type of change enabler to be implemented. In relational database environments, for example, the types of change enablers may include database triggers, stored procedures or a variety of other program modules configured to facilitate mappings in accordance to conditional modifiers defined for logical fields.

A free-form text box 1104 is also provided to allow the user to input instructions related to the configuration and functionality provided by the change enabler. Specifically, the instructions may be provided in syntax that is translatable by the DAM 150 and may be directed to creating, configuring or managing the change enabler 140. Once satisfied with the change enabler configuration, the continue button 905 can be selected to proceed with processing. If the user desires to leave the current screen without saving any changes, the cancel button 906 can be selected.

Figure 12:
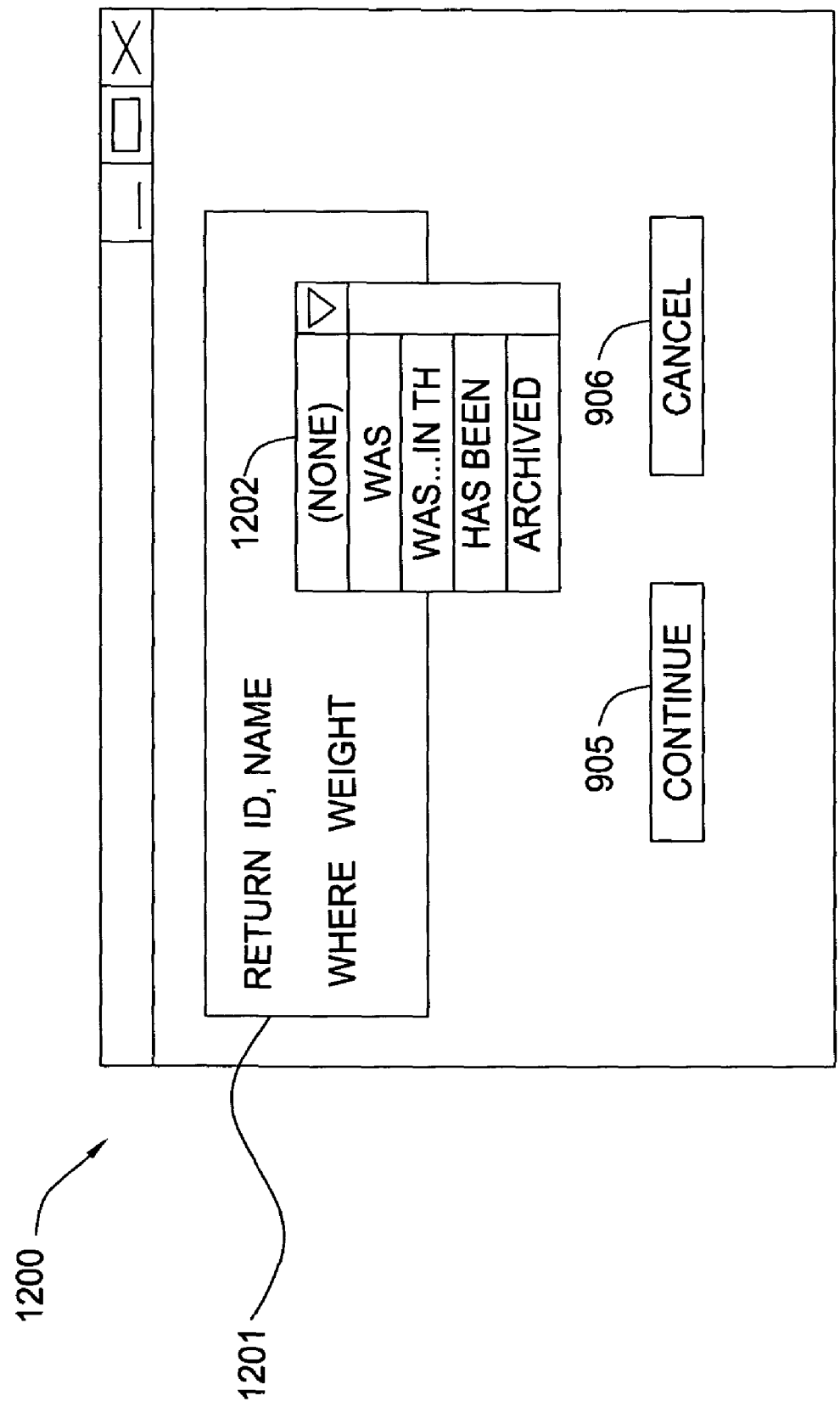
FIGS. 12-13 illustrate exemplary GUI screens directed to building abstract queries that utilize logical fields with conditional modifiers.
Figure 13:
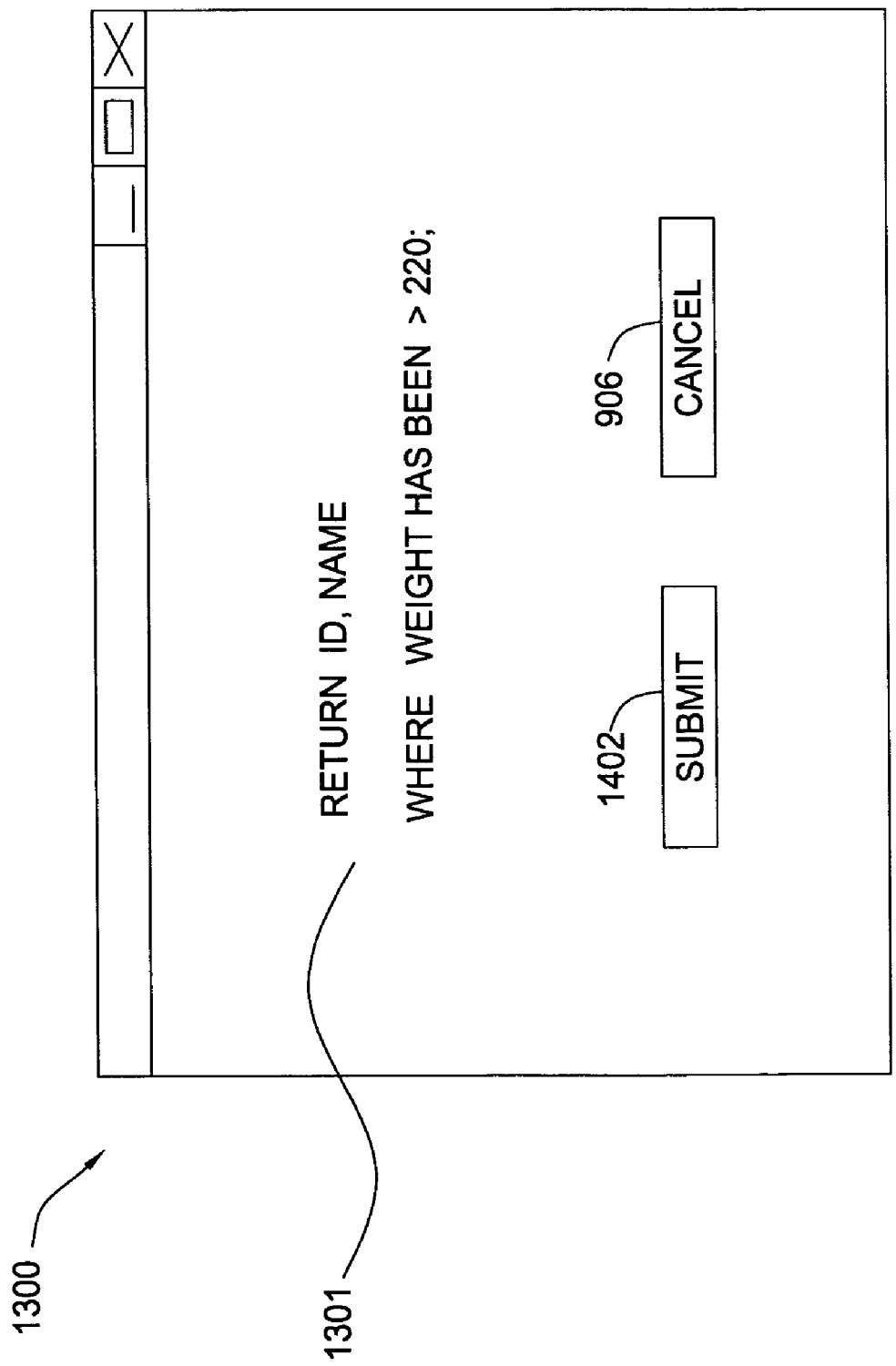

FIGS. 12 and 13 are GUI screens designed to allow users, such as end users, business users and analysts, to build abstract queries that contain logical fields that are configured to be used with conditional modifiers. FIG. 12 illustrates a GUI screen that contains a large free-form text box 1201 that allows users to input an abstract query that is to be submitted to the DAM 150 for translation.

As the abstract query is being entered in box 1201, it is parsed and analyzed by referencing the DAM 150. In some cases, users may have previous knowledge of conditional modifiers that are available for a particular field and may enter the conditional modifiers as they are crafting the query. In other cases, users may not be aware of all available conditional modifiers for a given logical field. In these cases, users may be provided with a drop down box 1202 containing a list of available conditional modifiers that can be included in the conditional portion of the abstract query. In other words, the system alerts users that certain conditional modifiers (associated with a logical field in the conditional) are available for use with the current query. The user is allowed to pick one of the available conditional modifiers to be included in the abstract query. In other embodiments, users may be alerted regarding available logical modifiers for a particular logical field via other graphical means, such as highlighting the logical field within box 1200 or displaying the logical field as a link that, when selected, presents a separate window that allows the selection of an available conditional modifier.

It should be noted that "available" conditional modifiers are those that have been configured for the particular logical field. Once the user selects the desired available conditional modifier, the continue button 905 can be selected to continue processing and present the GUI screen illustrated in FIG. 13.

Next, the updated version of the abstract query 1301, including the user selected conditional modifier (i.e., HAS BEEN), is presented to the user in a confirmation screen as illustrated in FIG. 13. If the user is satisfied with the query, the submit button 1302 can be selected to submit the abstract query for translation into a physical query. The physical query, in turn, is then submitted to a database management system for processing.

Many of the example queries described above present fields and records from two tables within a single database. However, those skilled in the art will recognize the methods described herein may be used with transactions affecting records from multiple tables which may be located in various databases in a distributed database environment.

While the conditions in the exemplary abstract queries above contain only one logical field, it should be understood that embodiments of the current invention can contain several logical fields in the conditional portion of the abstract query. Further, while the examples above are based on logical fields configured with conditional modifiers directed to referencing historical data, those skilled in the art will recognize that there are a variety of uses for conditional modifiers. In short, conditional modifiers can be implemented to facilitate the use of multiple mappings for any logical field.

While the foregoing is directed to embodiments of the present invention, other and further embodiments of the present invention may be devised without departing from the basic scope thereof, and the scope thereof is determined by the claims that follow.

What is claimed is:

1. A data processing system for retrieving data comprising:
 a non-transitory computer-readable medium;
 an abstract model, stored on the non-transitory computer-readable medium, and comprising a plurality of definitions of logical fields, each definition comprising a logical field name and a mapping referencing physical data, wherein at least one logical field comprises:
  at least a first mapping referencing data in a first physical data structure;
  a second mapping referencing data in a second physical data structure; and
  a first conditional modifier allowing the logical field to be selectably mapped to the first physical data structure using the first mapping or the second physical data structure using the second mapping, depending on the presence of the first conditional modifier in an abstract query containing the at least one logical field;
 a hardware processor of a computer system; and
 a query processor executing on the hardware processor of the computer system, and configured to convert one or more abstract queries containing logical fields configured with conditional modifiers into one or more executable queries of a given query language by referencing the abstract model.

2. The data processing system of claim 1, wherein the at least one logical field is configured with a third mapping referencing data in a third physical data structure and a second conditional modifier allowing the logical field to be selectably mapped to the first physical data structure using the first mapping or the third physical data structure using the third mapping, depending on the presence of the second conditional modifier in an abstract query containing the at least one logical field.

3. The data processing system of claim 2, further comprising a graphical user interface configured to allow users to:
 configure the first conditional modifier for the logical field so that, when used, the first conditional modifier maps the logical field to the second physical data structure using the second mapping; and
 configure the second conditional modifier for the logical field so that, when used, the second conditional modifier maps the logical field to the third physical data structure using the third mapping.

4. The data processing system of claim 1, further comprising a data repository containing the physical data structures and wherein the data repository is a relational database managed by a relational database management system.

5. The data processing system of claim 1, further comprising a data repository containing the physical data structures and wherein the data repository is one of: a relational database, XML database, and object-relational database.

6. The data processing system of claim 1, wherein the first physical data structure and the second physical data structure are contained in a data repository, wherein the data repository is one of: a relational database, XML database, and object-relational database.

7. A data processing system for retrieving data comprising:
   a non-transitory computer-readable medium;
   an abstract model, stored on the non-transitory computer-readable medium, and comprising a plurality of definitions of logical fields, each definition comprising a logical field name and a mapping referencing physical data, wherein at least one logical field comprises:
      at least a first mapping referencing data in a first physical data structure;
      a second mapping referencing data in a second physical data structure; and
      a first conditional modifier allowing the logical field to be selectably mapped to the first physical data structure using the first mapping or the second physical data structure using the second mapping, depending on the presence of the first conditional modifier in an abstract query containing the at least one logical field;
   a change enabler configured to create additional physical data structures and populate the additional physical data structures with specific data selected from existing physical data structures, the change enabler being invoked when the additional physical data structures are required for supporting additional mappings for a given logical field;
   a hardware processor of a computer system; and
   a query processor executing on the hardware processor of the computer system, and configured to convert one or more abstract queries containing logical fields configured with conditional modifiers into one or more executable queries of a given query language by referencing the abstract model.

8. The data processing system of claim 7, wherein the first physical data structure and second physical data are contained in a data repository, wherein the data repository is a relational database managed by a relational database management system.

9. The data processing system of claim 7, further comprising a graphical user interface configured to allow users to:
   configure the first conditional modifier for the logical field so that, when used, the first conditional modifier maps the logical field to the second physical data structure using the second mapping;
   configure the second conditional modifier for the logical field so that, when used, the second conditional modifier maps the logical field to the third physical data structure using the third mapping;
   configure the change enabler to create a third physical data structure and populate the third physical data structure with specific data from the first physical data structure; and
   configure the third conditional modifier for the logical field so that, when used, the second conditional modifier maps the logical field to the third physical data structure using the third mapping.

10. The data processing system of claim 9, wherein the first physical data structure, the second physical data structure and the third physical data structure are contained in a common data repository selected from one of: a relational database, XML database, and object-relational database.

11. The data processing system of claim 9, wherein the first physical data structure, the second physical data structure and the third physical data structure reside in three different data repositories, wherein the data repositories are implemented as databases in a distributed database environment.

12. A computer implemented method for retrieving data, comprising:
   parsing an abstract query and identifying logical fields and their respective conditional modifiers contained within the conditional portion of the abstract query, wherein conditional modifiers allow a logical field to be selectably mapped to multiple physical data structures using multiple mappings, wherein a particular mapping is selected depending on the presence of a particular conditional modifier in the abstract query containing the logical field;
   retrieving mapping data related to the conditional modifiers configured for each logical field in the conditional portion of the abstract query; and
   generating, by operation of a hardware processor of a computer system, a physical query by utilizing the retrieved mapping data.

13. The computer implemented method of claim 12, wherein a graphical user interface is provided to create and manage the logical fields, conditional modifiers and abstract queries.

14. A computer implemented method for configuring a logical field in an abstract model, comprising:
   providing an abstract model comprising logical field definitions mapped to the physical data structures;
   creating a first mapping between the logical field and a first physical data structure;
   defining a conditional modifier for the logical field to enable the logical field to utilize a second mapping between the logical field and a second physical data structure;
   if the second physical data structure does not exist, invoking a change enabler to create and populate the second physical data structure; and
   creating, by operation of a hardware processor of a computer system, the second mapping between the logical field and the second physical field.

15. The computer implemented method of claim 14, wherein the first physical data structure, the second physical data structure and the third physical data structure are all part of a data repository, wherein the data repository is one of: a relational database, XML database, and object-relational database.

16. The computer implemented method of claim 14, wherein a graphical user interface is provided to facilitate configuration of the logical field.

17. A method in a computer system for building abstract queries containing logical fields with conditional modifiers, comprising:
   displaying a first graphical user interface object to accept an abstract query;
   in response to the entered abstract query, parsing the abstract query;
   determining if any logical fields in the conditional portion of the abstract query are configured with conditional modifiers, wherein each conditional modifier enables a logical field to be selectably mapped to one of a plurality of physical data structures;
   if conditional modifiers are configured for any of the logical fields, displaying a second graphical user interface object that lists the available conditional modifiers for each logical field;
   allowing the user to select a conditional modifier for each field; and modifying, by operation of a hardware processor of the computer system, the abstract query so that it includes the conditional modifier in the conditional portion of the query.

18. The method of claim 17, wherein the first graphical user interface object and second graphical user interface object are one of: a combination box, drop down box, list box and text box.

19. A data processing system for retrieving data comprising:

a non-transitory computer-readable medium;

an abstract model, stored on the non-transitory computer-readable medium, and comprising a plurality of definitions of logical fields, each definition comprising a logical field name and a mapping referencing physical data, wherein at least one logical field comprises:

at least a first mapping referencing data in a first physical data structure containing current data;

a second mapping referencing data in a second physical data structure containing historical data; and a first conditional modifier allowing the logical field to be selectably mapped to the first physical data structure using the first mapping for providing query results based on current data or the second physical data structure using the second mapping for providing query results based on historical data, depending on the presence of the first conditional modifier in an abstract query containing the at least one logical field; and a hardware processor of a computer system; and a query processor executing on the hardware processor of the computer system, and configured to convert one or more abstract queries containing logical fields configured with conditional modifiers into one or more executable queries of a given query language by referencing the abstract model.

20. The data processing system of claim 19, wherein the at least one logical field is configured with a third mapping referencing data in the first physical data structure and the third physical data structure concurrently allowing the logical field to be selectably mapped to the first physical data structure using the first mapping or the first physical data structure and second physical data structure using the third mapping, depending on the presence of the second conditional modifier in an abstract query containing the at least one logical field.

* * * * *